(12) United States Patent
Helm et al.

(10) Patent No.: US 10,549,796 B2
(45) Date of Patent: Feb. 4, 2020

(54) CAB SUPPORT ARRANGEMENT FOR A UTILITY VEHICLE

(71) Applicants: ZF Friedrichshafen AG, Friedrichshafen (DE); DEERE & COMPANY, Moline, IL (US)

(72) Inventors: Eike Helm, Diepholz (DE); Jens Eismann, Melle (DE); Stefan Grossmann, Zarpen (DE); Donald E. Young, Cedar Falls, IA (US); Jonathan Roth, Cedar Falls, IA (US); Byron Manternach, Hopkinton, IA (US)

(73) Assignees: ZF FRIEDRICHSHAFEN AG, Friedrichshafen (DE); DEERE & COMPANY, Moline, IL (US)

( * ) Notice: Subject to any disclaimer, the term of this patent is extended or adjusted under 35 U.S.C. 154(b) by 155 days.

(21) Appl. No.: 15/748,326

(22) PCT Filed: Jun. 28, 2016

(86) PCT No.: PCT/EP2016/064901
§ 371 (c)(1),
(2) Date: Jan. 29, 2018

(87) PCT Pub. No.: WO2017/016774
PCT Pub. Date: Feb. 2, 2017

(65) Prior Publication Data
US 2018/0201331 A1 Jul. 19, 2018

(30) Foreign Application Priority Data
Jul. 30, 2015 (DE) .......................... 10 2015 214 456

(51) Int. Cl.
*B60J 7/00* (2006.01)
*B62D 33/06* (2006.01)
*B60G 99/00* (2010.01)

(52) U.S. Cl.
CPC ....... *B62D 33/0608* (2013.01); *B60G 99/002* (2013.01); *B62D 33/0604* (2013.01); *B62D 33/0617* (2013.01); *B60G 2204/162* (2013.01)

(58) Field of Classification Search
CPC .. B60G 21/051; B60G 2200/31; B60G 9/003; B60G 2200/462; B60G 2204/422;
(Continued)

(56) References Cited

U.S. PATENT DOCUMENTS 3,944,017 A * 3/1976 Foster ................ B62D 33/0608
180/89.15
5,553,911 A * 9/1996 Bodin ................ B62D 33/0604
180/89.12
(Continued)

FOREIGN PATENT DOCUMENTS

DE 81 742 1/1895
DE 42 42 166 A1 6/1994
(Continued)

OTHER PUBLICATIONS

German Search Report Corresponding to 10 2015 214 456.9 dated Nov. 14, 2017.
(Continued)

*Primary Examiner* — Kiran B Patel
(74) *Attorney, Agent, or Firm* — Davis & Bujold PLLC; Michael J. Bujold

(57) ABSTRACT

A cabin suspension arrangement for a utility vehicle, having a plurality of trailing arms that extend in a longitudinal direction, by which a driver's cabin is mounted and can pivoted relative to a vehicle frame. Two of the trailing arms are arranged spaced apart from one another in a transverse direction that extends perpendicularly to the longitudinal direction, are connected to one another by a torsion bar spring that extends in the transverse direction, and are
(Continued)

arranged at the same height in a vertical direction perpendicular to the longitudinal direction and to the transverse direction, thereby forming a first trailing arm pair. Two other trailing arms are arranged spaced apart from one another in the transverse direction, are arranged at the same height in the vertical direction, and thereby form a second trailing arm pair, which is spaced apart, in the vertical direction, from the first trailing arm pair.

18 Claims, 5 Drawing Sheets

(58) Field of Classification Search
CPC .......... B60G 2200/21; B60G 2204/143; A61B 17/7032; A61B 2090/037
USPC ........................................ 296/190.07, 190.01
See application file for complete search history.

(56) References Cited

U.S. PATENT DOCUMENTS

| | | | | |
|---|---|---|---|---|
| 6,109,381 | A * | 8/2000 | Stuyvenberg | B62D 33/0608 180/89.12 |
| 6,206,121 | B1 * | 3/2001 | Michel | B60G 17/025 180/89.13 |
| 6,883,813 | B2 * | 4/2005 | Gottschalk | B62D 61/125 180/209 |
| 8,333,396 | B2 * | 12/2012 | Saieg | B60G 9/003 280/124.116 |
| 8,371,562 | B2 | 2/2013 | Knevels | |
| 8,641,062 | B2 * | 2/2014 | Gottschalk | B60G 9/02 180/24.02 |
| 8,764,039 | B2 * | 7/2014 | Keller | B60G 3/202 280/124.128 |
| 9,662,949 | B2 * | 5/2017 | Spielmann | B60G 7/001 |
| 2002/0175486 | A1 * | 11/2002 | Young | B60G 3/20 280/124.135 |
| 2007/0056787 | A1 * | 3/2007 | Haeusler | B60G 99/002 180/89.13 |
| 2007/0267894 | A1 * | 11/2007 | Van Den Brink | B62D 33/0604 296/190.07 |
| 2011/0095569 | A1 * | 4/2011 | Haeusler | B60G 99/006 296/190.07 |
| 2013/0300081 | A1 * | 11/2013 | Champion | B62D 33/0608 280/124.104 |
| 2014/0225417 | A1 | 8/2014 | Meinders et al. | |
| 2015/0048653 | A1 * | 2/2015 | Jarnstrom | F16F 1/16 296/190.07 |
| 2015/0158361 | A1 * | 6/2015 | Eismann | B60G 7/001 280/124.116 |
| 2016/0207430 | A1 * | 7/2016 | Haller | B60N 2/501 |
| 2017/0008361 | A1 * | 1/2017 | Langhorst | B60G 13/005 |
| 2017/0225721 | A1 * | 8/2017 | Bumueller | E21F 13/025 |

FOREIGN PATENT DOCUMENTS

| | | |
|---|---|---|
| DE | 10 2007 013 241 A1 | 9/2008 |
| DE | 10 2009 058 598 A1 | 6/2011 |
| DE | 11 2011 101 558 T5 | 2/2013 |
| EP | 0 943 532 A2 | 9/1999 |
| EP | 1 645 494 A2 | 4/2006 |
| WO | 2012/142560 A2 | 10/2012 |

OTHER PUBLICATIONS

International Search Report Corresponding to PCT/EP2016/064901 dated Sep. 22, 2016.
Written Opinion Corresponding to PCT/EP2016/064901 dated Sep. 22, 2016.

* cited by examiner

CAB SUPPORT ARRANGEMENT FOR A UTILITY VEHICLE

This application is a National Stage completion of PCT/EP2016/064901 filed Jun. 28, 2016, which claims priority from German patent application serial no. 10 2015 214 456.9 filed Jul. 30, 2015.

FIELD OF THE INVENTION

The invention concerns a cabin suspension arrangement for a utility vehicle, having a plurality of trailing arms extending in, or essentially in a longitudinal direction, by means of which a driver's cabin is mounted so that it can move on a vehicle frame, such that two of the trailing arms are arranged in a direction perpendicular to the longitudinal direction at a distance apart from one another, are connected to one another by a torsion bar spring that extends in the transverse direction, and are arranged at the same height in a vertical direction that is perpendicular to the longitudinal direction and perpendicular to the transverse direction, forming a first trailing arm pair.

BACKGROUND OF THE INVENTION

Such a cabin suspension arrangement is known from EP 1 645 494 A2, wherein an additional trailing arm is arranged in the transverse direction mid-way between, and in the vertical direction above the first trailing arm pair. This system has the disadvantage that during rolling movement of the driver's cabin the additional trailing arm is stressed or twisted. Thus, the spring constants of the first trailing arm pair and the additional trailing arm have to be matched to one another, which however in practice always entails a compromise since the spring constants and the component strengths too have to be matched. It is also a disadvantage that yawing of the driver's cabin has to be absorbed mainly by the first trailing arm pair. Consequently the mounting of the first trailing arm pair must be made relatively rigid in order to be able to keep yawing movements within a range that is acceptable for comfort. In turn however, the result of this is that during excitations in the longitudinal direction, owing to the rigid mounting the driver's cabin reacts with greater longitudinal jerkiness, which is uncomfortable. Moreover, with the arrangement according to EP 1 645 494 A2 the problem exists that as a rule, there is no fitting space available ahead of the driver's cabin for fitting the trailing arm.

SUMMARY OF THE INVENTION

Starting from there, the purpose of the present invention is to develop further a cabin suspension arrangement of the type mentioned to begin with, in such manner that the stressing or twisting of trailing arms and/or their mountings due to rolling movement of the driver's cabin can be avoided or at least reduced.

This objective is achieved by a cabin suspension arrangement according to the independent claim(s). Preferred further developments of the cabin suspension arrangement are defined in the subordinate claims and in the description given below.

The cabin suspension arrangement for a utility vehicle comprises a plurality of trailing arms that extend in, or essentially in a longitudinal direction, by means of which a driver's cabin is mounted and can move, in particular pivot, on a vehicle frame, wherein two of the trailing arms are arranged in a transverse direction that extends perpendicularly to the longitudinal direction at a distance apart from one another, are connected to one another, in particular firmly, by a torsion bar spring that extends in the transverse direction, are arranged at the same height in a vertical direction that is perpendicular to the longitudinal direction and perpendicular to the transverse direction, and form a first trailing arm pair, and wherein two other trailing arms are arranged at a distance apart from one another at the same height in the vertical direction and form a second trailing arm pair which is a distance away from the first trailing arm pair in the vertical direction.

The use of the two trailing arm pairs a distance apart in the vertical direction makes it possible to absorb loads introduced into the trailing arms due to rolling movement laterally and not centrally, so that stressing or twisting of the trailing arms can be avoided or at least substantially reduced. There are preferably four trailing arms.

Expressions such as "front" or "rear" or the like refer in particular to the longitudinal direction and/or to a travel direction preferably extending in the longitudinal direction of the, or of a utility vehicle. Expressions such as "lateral" or the like refer in particular to the transverse direction. Expressions such as "above" or the like refer in particular to the vertical direction.

Preferably the trailing arms of each trailing arm pair, are of equal length particularly in the longitudinal direction and/or in relation to their longitudinal extension. Preferably the trailing arms of the first trailing arm pair are the same length as the trailing arms of the second trailing arm pair, particularly in the longitudinal direction and/or in relation to their longitudinal extension.

Advantageously, each trailing arm forms an elongated body. For example, the trailing arms are each straight or substantially straight. Alternatively, however, a curved and/or bent shape of the trailing arms is also possible, particularly if the fitting space available makes that necessary. Preferably, the trailing arms are each rigid bodies, The trailing arms are preferably made of metal, in particular a ferrous material such as steel.

The trailing arms of each trailing arm pair are preferably of the same or similar design and/or mirror-symmetrical relative to a longitudinal-vertical plane extending in the vertical direction. The trailing arms of one or both trailing arm pairs preferably extend parallel with one another and/or are preferably arranged parallel to one another. Alternatively, however, it is also possible for the trailing arms of at least one or both trailing arm pairs not to be parallel to one another. For example the trailing arms of at least one or both pairs can be inclined relative to one another. Furthermore, the trailing arms of each trailing arm pair arranged above one another in the vertical direction are preferably parallel with one another. In particular, the trailing arm pairs are arranged parallel with one another. Preferably the trailing arm pairs are arranged one above the other, especially in the vertical direction. Preferably, the first trailing arm pair is arranged above the second trailing arm pair, in particular in the vertical direction. Alternatively, however, the second trailing arm pair can also be arranged over the first trailing arm pair, particularly in the vertical direction.

In one embodiment all the trailing arms, or at least the trailing arms of each trailing arm pair arranged above one another in the vertical direction, are of the same or similar design. This makes for a large number of equivalent components. Alternatively, the trailing arms of the second trailing arm pair are made weaker and/or lighter than the trailing arms of the first trailing arm pair. In that way weight can be saved. A weaker design of the trailing arms of the second trailing arm pair is permissible since due to the torsion bar spring connecting them, the trailing arms of the first trailing arm pair are as a rule exposed to higher loads than the trailing arms of the second trailing arm pair. In particular, the trailing arms of the second trailing arm pair are not connected to one another by a torsion bar spring. Preferably, the trailing arms of the second trailing arm pair are not connected rigidly to one another.

The torsion bar spring is preferably in the form of a tube. In particular, the ends of the torsion bar spring are connected firmly and/or rigidly to the trailing arms of the first trailing arm pair, for example by welding or a press-fit connection. Advantageously, the ends of the torsion bar spring have a polygonal circumferential contour and are inserted and/or press-fitted into correspondingly contoured holders in the trailing arms of the first trailing arm pair. Alternatively, however, the trailing arms of the first trailing arm pair can also be made integrally and/or material-homogeneously with the torsion bar spring. The torsion bar spring is preferably made of metal, in particular a ferrous material such as steel.

According to a further development, the trailing arms of the first trailing arm pair are mounted so that they can be pivoted about a first pivot axis on the driver's cabin and can be pivoted about a second pivot axis on the vehicle frame. Furthermore, the trailing arms of the second trailing arm pair are preferably mounted so that they can pivot about a third pivot axis on the driver's cabin and can pivot about a fourth pivot axis on the vehicle frame. Advantageously, each of the pivot axes extends in the transverse direction. Preferably, the first pivot axis and the third pivot axis lie in a first plane that extends in the transverse direction and in the vertical direction. Moreover, the second pivot axis and the fourth pivot axis preferably lie in a second plane that extends in the transverse direction and in the vertical direction. In the longitudinal direction the second plane is in particular a distance away from the first plane. Advantageously, the first pivot axis and the third pivot axis are arranged one above the other in the vertical direction. Furthermore, the second and the fourth pivot axes are advantageously arranged one above the other in the vertical direction. In particular, in the longitudinal direction the first pivot axis and the second pivot axis are a distance away from one another. In addition, the third pivot axis and the fourth pivot axis are in particular a distance away from one another in the longitudinal direction.

In one embodiment the trailing arms of each trailing arm pair are mounted so that they can pivot on the driver's cabin at a first end and on the vehicle frame at a second end. Preferably, the trailing arms of the first trailing arm pair are mounted so that they can pivot at their, or at a first, end on the driver's cabin, in particular about the first pivot axis and at their, or at a second, end on the vehicle frame, in particular about the second pivot axis. Furthermore, the trailing arms of the second trailing arm pair are preferably mounted so that they can pivot at their, or at a first, end on the driver's cabin, in particular about the third pivot axis and at their, or at a second, end on the vehicle frame, in particular about the fourth pivot axis. In particular, each trailing arm of the first trailing arm pair is connected between its ends by the torsion bar spring, preferably firmly and/or rigidly. Preferably, the trailing arms are in each case connected and/or articulated by a rubber mounting to the driver's cabin. In particular these rubber mountings are associated with the trailing arms. Moreover, the trailing arms are in each case preferably connected and/or articulated by a rubber mounting to the vehicle frame. In particular, these rubber mountings are associated with the trailing arms.

In the vertical direction, the driver's cabin is arranged on and/or preferably above the vehicle frame. The vehicle frame is preferably the vehicle frame of the, or of a, utility vehicle. Moreover, the driver's cabin is preferably the driver's cabin of the, or of a, utility vehicle. The driver's cabin contains for example a seat and/or a steering wheel. The utility vehicle is in particular a motor vehicle. Advantageously, the utility vehicle is an agricultural utility vehicle. Preferably, the longitudinal direction corresponds to a longitudinal direction of the utility vehicle. Preferably, the transverse direction corresponds to a transverse direction of the utility vehicle. The vertical direction preferably corresponds to a vertical direction of the utility vehicle. The, or a, travel direction and/or forward driving direction of the utility vehicle is preferably the longitudinal direction.

The trailing arm pairs are preferably arranged under the driver's cabin. In particular, in the vertical direction the trailing arm pairs are arranged between the vehicle frame and the driver's cabin. For example, the trailing arm pairs are arranged in front of or behind the driver's cabin relative to the travel direction.

Preferably, the driver's cabin comprises two brackets a distance apart from one another in the transverse direction, which extend away from the driver's cabin in the vertical direction, in particular downward. Preferably the trailing arms are articulated on the brackets of the driver's cabin and, in particular, thereby mounted so that they can pivot on the driver's cabin. In addition the vehicle frame preferably comprises two brackets a distance apart from one another in the transverse direction, which extend away from the vehicle frame in the vertical direction, in particular upward. Preferably, the trailing arms are articulated on the brackets of the vehicle frame and, in particular, thereby mounted so that they can pivot on the vehicle frame. Preferably, the brackets in each case form a rigid body. The brackets are all preferably made of metal, in particular a ferrous material such as steel.

In a further development, the driver's cabin is supported on the vehicle frame, particularly in the transverse direction, by means of a supporting member which preferably extends in, or essentially in the transverse direction. Preferably, the supporting member is mounted in particular so that it can pivot on the vehicle frame about a first supporting member pivot axis that extends in the longitudinal direction. Furthermore, the supporting member is mounted in particular so that it can pivot on the driver's cabin about a second supporting member pivot axis that extends in the longitudinal direction. In particular, the two supporting member pivot axes are a distance apart from one another, preferably in the transverse direction. Preferably, the supporting member is mounted at one end so that it can pivot on the vehicle frame in particular about the first supporting member pivot axis and at another end so that it can pivot on the driver's cabin in particular about the second supporting member pivot axis. The supporting member is for example a transverse link or a Panhard bar. Preferably, the supporting member is a distance away in the longitudinal direction from the first and third pivot axes and/or from the pivot axes. Preferably, the supporting member is connected and/or articulated to the driver's cabin by means of a rubber mounting. In particular, the rubber mounting is associated with the supporting member. In addition, the supporting member is connected and/or articulated to the vehicle frame by means of a rubber mounting. In particular, the rubber mounting is associated with the supporting member. In particular, the supporting member can absorb and/or transmit forces in the transverse direction. Preferably, the supporting member opposes any movement of the driver's cabin in the transverse direction relative to the vehicle frame. In particular, the supporting member opposes any rotation of the driver's cabin about a vertical axis extending upward. The supporting member is preferably arranged in the vertical direction between the vehicle frame and the driver's cabin. For example, the supporting member is arranged under the driver's cabin.

Advantageously, the supporting member is an elongated body. For example, the supporting member is straight or substantially straight. Alternatively however, a curved and/or bent shape of the supporting member is also possible, especially when this is made necessary by the fitting space available. Preferably the supporting member is a rigid body. The supporting member is preferably made of metal, in particular a ferrous material such as steel.

According to an embodiment the driver's cabin is connected to and/or supported on the vehicle frame in a sprung and/or damped manner by a plurality, preferably by at least three or four springs and/or spring-damper devices. In particular, the spring and/or spring-damper devices are not all on a common straight line. Preferably, the springs and/or spring-damped devices are arranged at the corners of a triangle or a quadrilateral. Advantageously, the springs and/or spring-damped devices are arranged particularly in the vertical direction between the vehicle frame and the driver's cabin. The springs are each in the form of spiral springs, leaf springs or gas pressure springs. A spring-damper device is in particular understood to mean a combination of one, or at least one spring with one, or at least one damper, the spring being in particular a spiral, leaf or gas pressure spring.

The vehicle frame is preferably a rigid body. In particular the vehicle frame is made of metal, preferably a ferrous material such as steel.

The driver's cabin is preferably a rigid body. In particular the driver's cabin consists of plastic, metal or a combination of these materials. Preferably the driver's cabin has a frame structure. The frame structure preferably forms the load-bearing part of the driver's cabin. References to the driver's cabin are in particular understood to refer to the frame structure, and conversely. Advantageously, the frame structure is made of metal, preferably a ferrous material such as steel. The frame structure is preferably covered by cladding elements. The cladding elements consist for example of plastic and/or metal.

By virtue of the invention, in particular at least one or more of the following advantages can be achieved:

A movement of the cabin in the longitudinal direction and/or pivoting of the cabin about a transverse axis extending transversely (pitching) can be controlled by the four trailing arms (the first and second trailing arm pairs), particularly in combination with their rubber mountings. The rubber mountings of the trailing arms are preferably designed to be compliant in the longitudinal direction.

A movement of the driver's cabin in the transverse direction can be controlled by the trailing arms (the first trailing arm pair) connected firmly to one another by the torsion bar spring and/or by the supporting member (for example a Panhard bar).

A rotational movement of the cabin about the, or a, vertical axis (yawing) can be controlled by the trailing arms (first trailing arm pair) connected firmly to one another by the torsion bar spring and/or by the supporting member (for example a Panhard bar).

If the rubber mountings of the trailing arms are designed to be compliant in the longitudinal direction, it can happed that the trailing arms connected firmly to one another by the torsion bar spring (the first trailing arm pair) allow too large a rotation of the driver's cabin about the vertical axis (yawing). In such a case the supporting member (for example a Panhard rod) intervenes, by means of which a rotation of the driver's cabin about the vertical axis can be reduced, in particular to a level that is comfortable for driving.

A rotational movement of the driver's cabin about a longitudinal axis extending in the longitudinal direction (rolling) can be controlled by the spring-damper devices which are always under load during such a movement and/or by the trailing arms (first trailing arm pair) connected firmly to one another by the torsion bar spring.

BRIEF DESCRIPTION OF THE DRAWINGS

Below, the invention is described with reference to a preferred embodiment and in relation to the drawing, which shows.

DETAILED DESCRIPTION OF THE PREFERRED EMBODIMENTS

Figure 1:
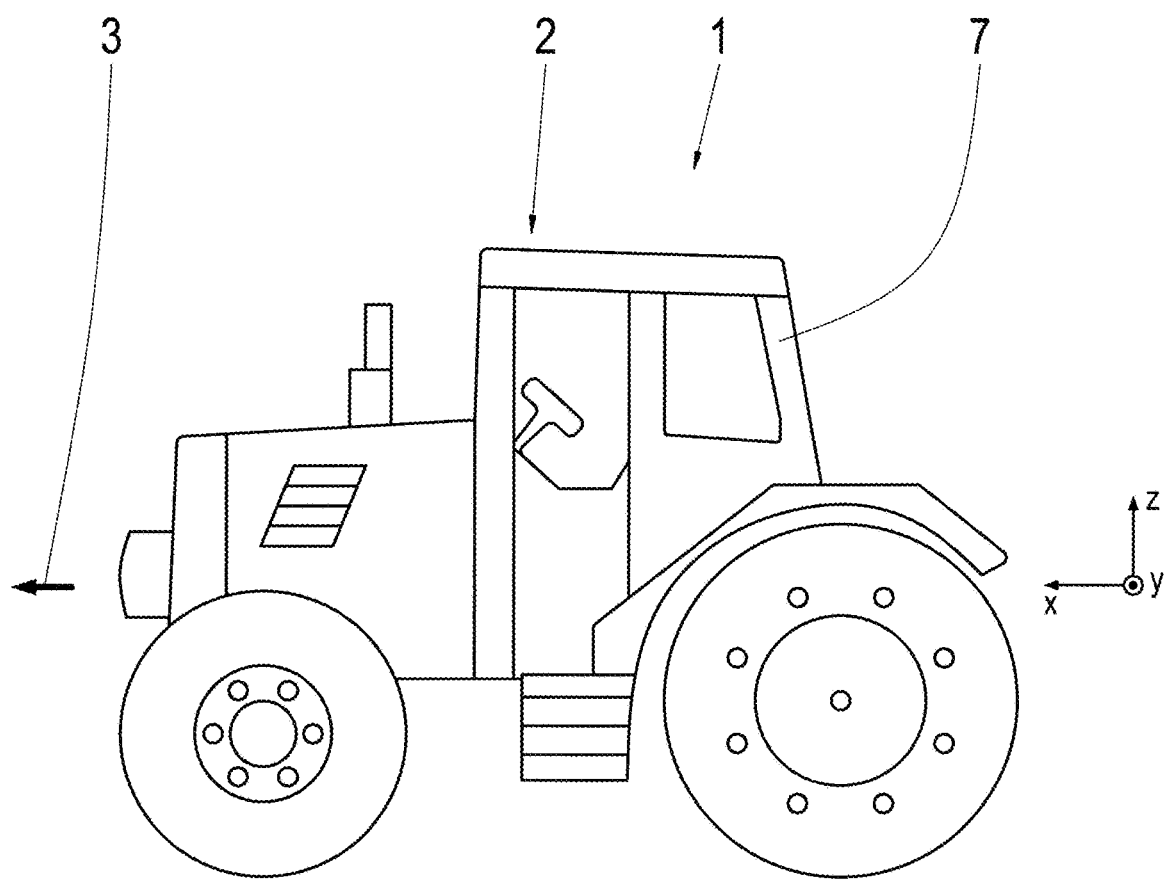
FIG. 1: A schematic side view of a utility vehicle with a driver's cabin.
Figure 2:
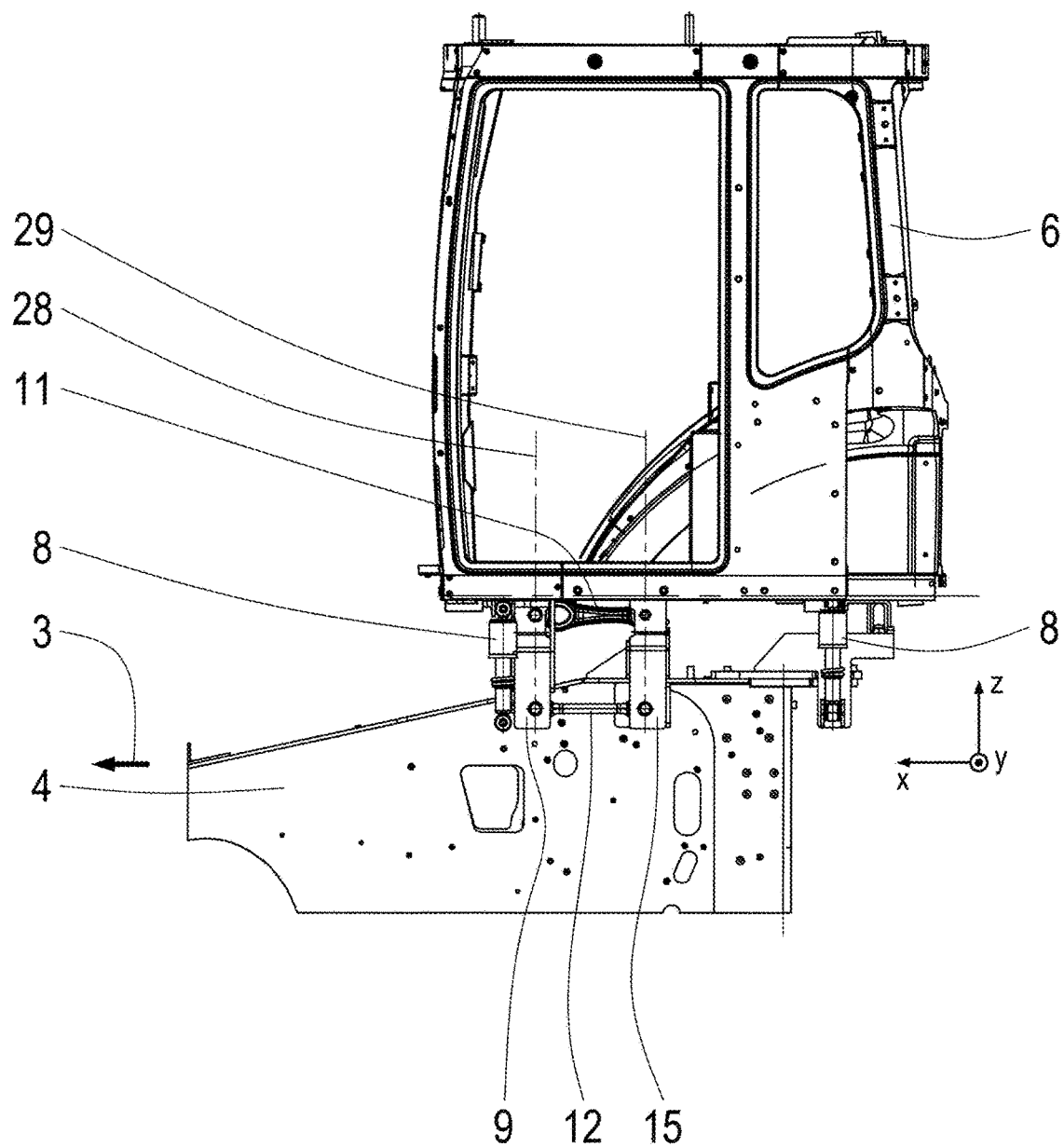
FIG. 2: A perspective view of part of a vehicle frame of the utility vehicle and a frame structure of the driver's cabin, which is mounted on the vehicle frame by an embodiment of a cabin suspension arrangement.
Figure 3:
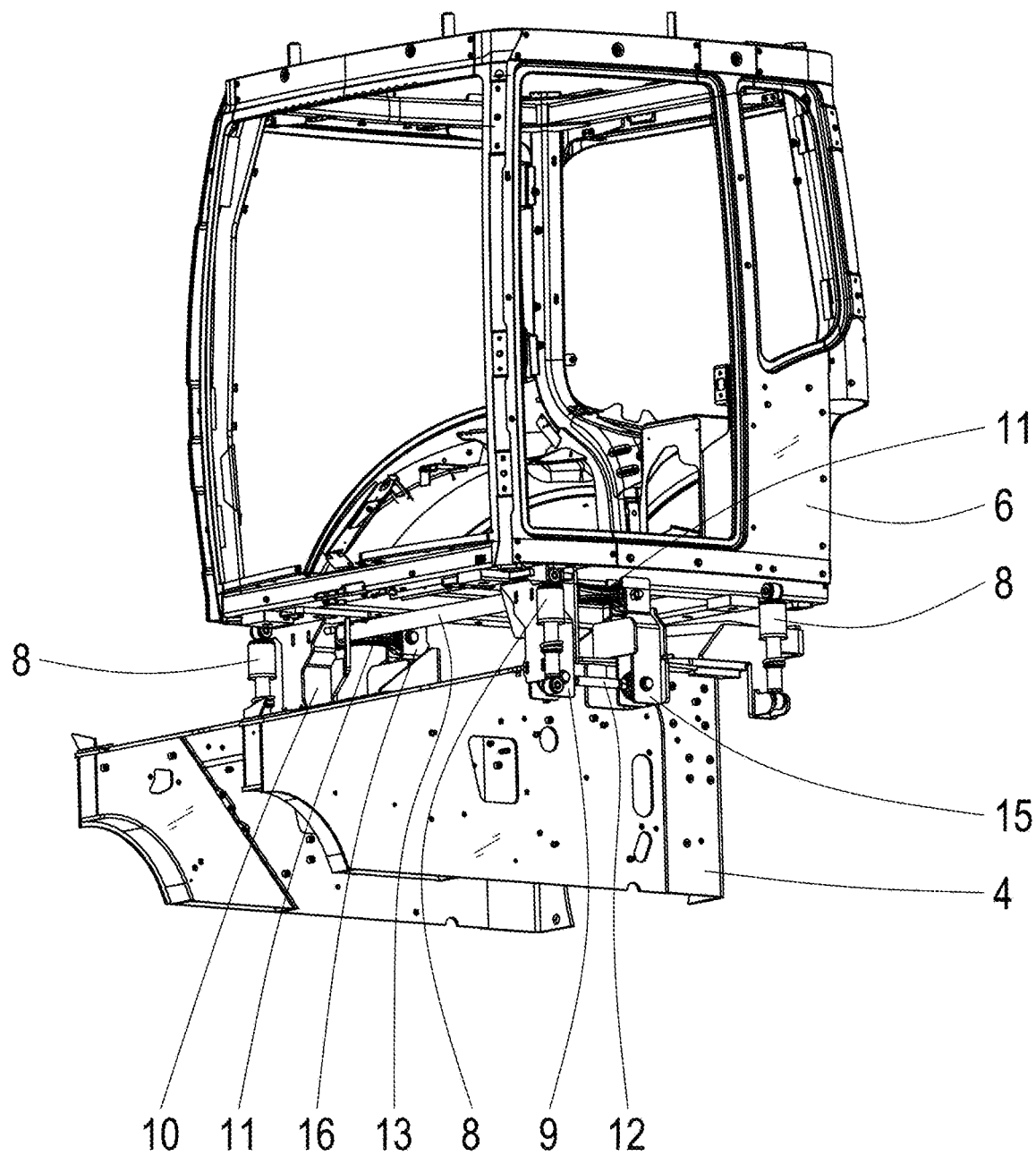
FIG. 3: A perspective view of part of the vehicle frame, the frame structure of the driver's cabin and the cabin suspension arrangement.
Figure 4:
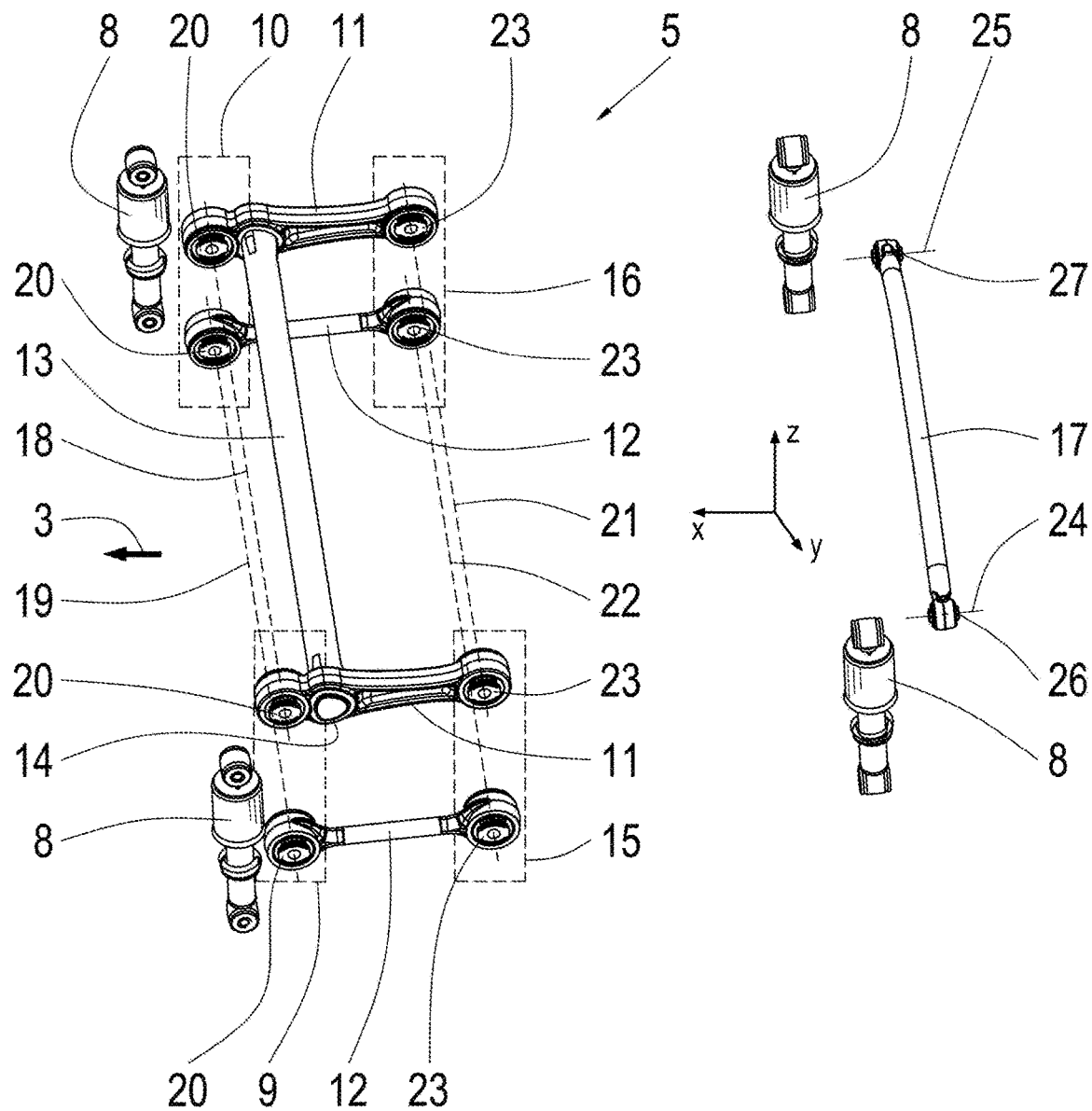
FIG. 4: A perspective view of the cabin suspension arrangement, with the vehicle frame and the driver's cabin omitted.
Figure 5:
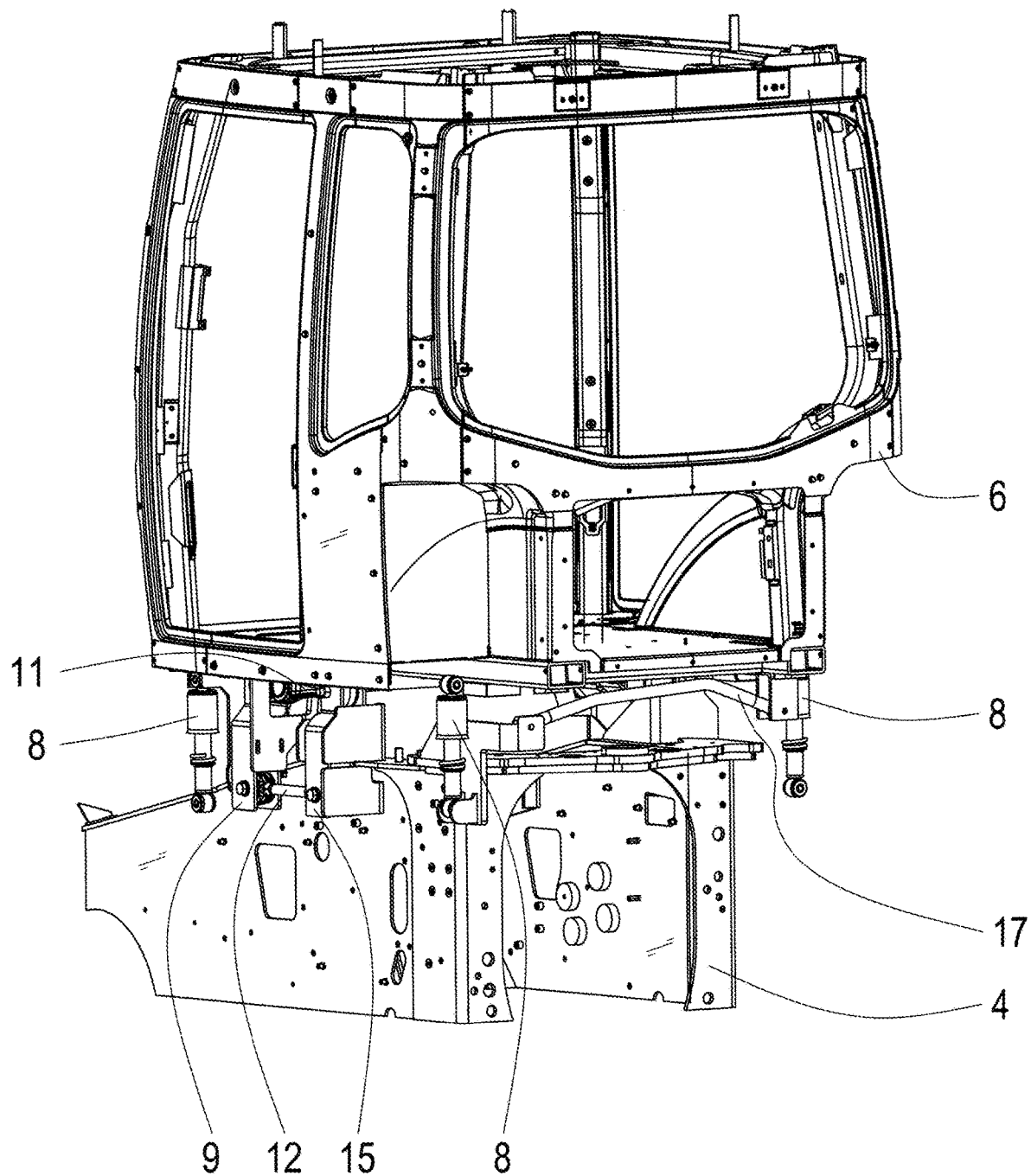
FIG. 5: Another perspective view of part of the vehicle frame, the frame structure of the driver's cabin and the cabin suspension arrangement.

FIG. 1 shows a side view of a utility vehicle 1 designed as a tractor with a driver's cabin 2. Furthermore the utility vehicle 1 has a usual forward driving direction 3 that extends in a longitudinal direction x of the utility vehicle. With supplementary intent, a transverse direction y of the vehicle perpendicular to the longitudinal direction x and a vertical direction z of the vehicle perpendicular to the longitudinal direction x of the utility vehicle 1 are also shown, the vehicle's transverse direction y being only indicated since it extends out of the plane of the figure. The utility vehicle 1 has a vehicle frame 4 on which the driver's cabin 2 is suspended and able to move by virtue of a cabin suspension arrangement 5 according to an embodiment of the invention. Furthermore, the driver's cabin 2 has a frame structure 6 which is covered in FIG. 1 by cladding elements 7. The vehicle frame 4, the frame structure 6 and the cabin suspension arrangement 5 can be seen in various views and partial views in FIGS. 2 to 5. Since the frame structure 6 is the load-bearing part of the driver's cabin, references to the frame structure 6 should be understood as references to the driver's cabin 2, and conversely, unless expressly otherwise stated.

The frame structure 6 is mounted on the vehicle frame by means of four spring-damper devices 8. Rigidly connected to the frame structure 6 there are two brackets 9 and 10 arranged a distanced apart from one another in the transverse direction y of the vehicle, on which are fitted respectively two trailing arms 11 and 12 arranged one under the other in the vertical direction z of the vehicle, each with one of their ends mounted so that it can pivot about respective pivot axes 18 and 19 that extend in the transverse direction y of the vehicle. In this case the trailing arms 11 and 12 are articulated to the brackets 9 and 10 by rubber mountings 20. Moreover, the pivot axes 18 and 19 lie in a plane 28 that extends in the transverse direction y of the vehicle and the vertical direction z of the vehicle. The trailing arms 11 opposite one another in the vehicle's transverse direction y are of similar design and form a first trailing arm pair. Furthermore, the trailing arms 11 of the first trailing arm pair are connected firmly to one another by a torsion bar spring 13 that extends in the transverse direction y of the vehicle. The ends of the torsion bar spring 13 each have a polygonal circumferential contour 14 and are press-fitted into correspondingly contoured holders of the trailing arms 11, so that the ends of the torsion bar spring 13 are firmly connected to the trailing arms 11. The trailing arms 12 opposite one another in the vehicle's transverse direction y are also similarly designed and form a second trailing arm pair. The brackets 9 and 10 are arranged, relative to the travel direction 3, at the front of and underneath the frame structure 6 and extend downward away from the latter.

Rigidly connected to the vehicle frame 4 there are two brackets 15 and 16 arranged a distance apart from one another in the transverse direction y of the vehicle, to which the trailing arms 11 and 12 are fitted each at another of its ends so that they can pivot about respective pivot axes 21 or 22 that extend in the transverse direction y of the vehicle. The trailing arms 11 and 12 are articulated to the brackets 15 and 16 by rubber mountings 23. Moreover, the pivot axes 21 and 22 lie in a plane 29 that extends in the transverse direction y of the vehicle and in the vertical direction z of the vehicle. The plane 29 is a distance away from the plane 28 in the longitudinal direction x. Relative to the travel direction 3 the brackets are arranged behind the brackets 9 and 10. Furthermore, the brackets 15 and 16 extend upward and away from the vehicle frame 4.

Behind the brackets 9, 10, 15 and 16 in the travel direction 3, the frame structure 6 is connected to the vehicle frame 4 by a Panhard bar 17 that extends in, or substantially in the transverse direction y of the vehicle. The Panhard bar 17 is mounted at one end so that it can pivot on the vehicle frame 4 about a pivot axis 24 extending in the longitudinal direction x of the vehicle. Furthermore, at its other end the Panhard bar 17 is mounted so that it can pivot on the frame structure 6 about a pivot axis 25 also extending in the longitudinal direction x of the vehicle. The Panhard bar 17 is articulated by a rubber mounting 26 to the vehicle frame 4 and by a rubber mounting 27 to the frame structure 6.

INDEXES

1 Utility vehicle
2 Driver's cabin
3 Travel direction
4 Vehicle frame
5 Cabin suspension arrangement
6 Frame structure of the driver's cabin
7 Cladding elements of the driver's cabin
8 Spring-damper device
9 Bracket
10 Bracket
11 Trailing arm
12 Trailing arm
13 Torsion bar spring
14 Polygonal circumferential contour
15 Bracket
16 Bracket
17 Panhard bar
18 Pivot axis
19 Pivot axis
20 Rubber mounting
21 Pivot axis
22 Pivot axis
23 Rubber mounting
24 Pivot axis
25 Pivot axis
26 Rubber mounting
27 Rubber mounting
28 Plane
29 Plane
x Longitudinal direction of the vehicle
y Transverse direction of the vehicle
z Vertical direction of the vehicle

The invention claimed is:

1. A cabin suspension arrangement, for a utility vehicle, comprising:
   a plurality of trailing arms that extend in, or essentially, in a longitudinal direction, by which a driver's cabin being mounted and movable on a vehicle frame,
   two of the trailing arms:
      being arranged spaced apart from one another in a transverse direction that extends perpendicularly to the longitudinal direction,
      being connected to one another by a torsion bar spring that extends in the transverse direction,
      being arranged at a same height in a vertical direction perpendicular to the longitudinal direction and to the transverse direction, and
      forming a first trailing arm pair, and
   two other trailing arms:
      being arranged spaced apart from one another in the transverse direction,
      being arranged at a same height in the vertical direction, and
      forming a second trailing arm pair, which is spaced away from the first trailing arm pair in the vertical direction.

2. The cabin suspension arrangement according to claim 1, wherein the trailing arms of each of the first and the second trailing arm pairs have an equal length with regard to their longitudinal extension.

3. The cabin suspension arrangement according to claim 2, wherein the trailing arms of the first trailing arm pair have a same length as the trailing arms of the second trailing arm pair with regard to their longitudinal extension.

4. The cabin suspension arrangement according to claim 1, wherein the trailing arms of each of the first and the second trailing arm pairs are arranged parallel to one another.

5. The cabin suspension arrangement according to claim 1, wherein the first and the second trailing arm pairs are arranged parallel to one another.

6. The cabin suspension arrangement according to claim 1, wherein the trailing arms of each of the first and the second trailing arm pairs are mounted and pivotable, at a first end, to the driver's cabin and, at a second end, to the vehicle frame.

7. The cabin suspension arrangement according to claim 1, wherein the trailing arms of the first trailing arm pair are mounted to the driver's cabin so as to be pivotable about a first pivot axis which extends in the transverse direction and mounted to the vehicle frame so as to be pivotable about a second pivot axis extending in the transverse direction, and the trailing arms of the second trailing arm pair are mounted so as to pivot on the driver's cabin about a third pivot axis extending in the transverse direction and on the vehicle frame about a fourth pivot axis extending in the transverse direction.

8. The cabin suspension arrangement according to claim 7, wherein the first pivot axis and the third pivot axis lie in a first plane that extends in the transverse direction and in the vertical direction, and the second pivot axis and the fourth pivot axis lie in a second plane that extends in the transverse direction and in the vertical direction, and the second plane is a spaced away from the first plane in the longitudinal direction.

9. The cabin suspension arrangement according to claim 1, wherein the driver's cabin is supported on the vehicle frame, in the transverse direction by a supporting member.

10. The cabin suspension arrangement according to claim 9, wherein the supporting member is spaced away from the first and the third pivot axes in the longitudinal direction.

11. The cabin suspension arrangement according to claim 9, wherein the supporting member is mounted so as to be pivotable on the vehicle frame about a first supporting member pivot axis that extends in the longitudinal direction and so as to be pivotable on the driver's cabin about a second supporting member pivot axis.

12. The cabin suspension arrangement according to claim 1, wherein the driver's cabin is supported on the vehicle frame by four spring-damper devices.

13. A cabin suspension arrangement for a utility vehicle, and the cabin suspension arrangement comprising:
   first and second pairs of trailing arms extending in a longitudinal direction of the vehicle, and a driver's cabin being mounted, via the first and the second pairs of trailing arms, on a vehicle frame;
   the first pair of trailing arms being arranged spaced apart from one another in a transverse direction that extends perpendicularly to the longitudinal direction, the first pair of trailing arms being connected to one another by a torsion bar spring that extends in the transverse direction, and the first pair of trailing arms being arranged at a same height in a vertical direction perpendicular to the longitudinal direction and to the transverse direction; and
   the second pair of trailing arms being arranged spaced away from one another in the transverse direction, the second pair of trailing arms being arranged at a same height in the vertical direction, and the second pair of trailing arms being spaced away from the first trailing arm pair in the vertical direction.

14. The cabin suspension arrangement according to claim 13, wherein the trailing arms of the first pair of trailing arms and the trailing arms of the second pair of trailing arms having equivalent longitudinal lengths.

15. The cabin suspension arrangement according to claim 14, wherein the trailing arms of the first pair of trailing arms and the trailing arms of the second pair of trailing arms are parallel to one another.

16. The cabin suspension arrangement according to claim 15, wherein the trailing arms of the first and the second pairs of trailing arms each have a first end and an opposite second end, the first ends of the trailing arms of the first and the second pairs of trailing arms are pivotably mounted to the driver's cabin, and the second ends of the trailing arms of the first and the second pairs of trailing arms are pivotably mounted to the vehicle frame.

17. The cabin suspension arrangement according to claim 16, wherein the first ends of the trailing arms of the first pair of trailing arms are pivotable about a first pivot axis, the second ends of the trailing arms of the first pair trailing arms are pivotable about a second pivot axis, the first ends of the trailing arms of the second pair of trailing arms are pivotable about a third pivot axis, and the second ends of the trailing arms of the second pair of trailing arms are pivotable about a fourth pivot axis, and the first, the second, the third and the fourth pivot axes each extend in the transverse direction.

18. The cabin suspension arrangement according to claim 17, wherein the first and the third pivot axes are parallel to one another and define a first plane that extends in the transverse and the vertical directions, and the second and the fourth pivot axes are parallel to one another and define a second plane that extends in the transverse and the vertical directions, and the first and the second planes are parallel to one another and are spaced apart from each other in the longitudinal direction.

* * * * *